(12) United States Patent
Sittler et al.

(10) Patent No.: US 9,059,795 B2
(45) Date of Patent: Jun. 16, 2015

(54) PROCESS AND APPARATUS FOR REDUCING EMI IN THE RF SUBSYSTEM OF A WIRELESS COMMUNICATION SYSTEM

(75) Inventors: François Sittler, Thorigne-Fouillard (FR); Dominique Brunel, Antibes (FR); Laurent Noel, Le Cannet (FR)

(73) Assignee: ST-Ericsson SA, Plan-les-Ouates (CH)

( * ) Notice: Subject to any disclaimer, the term of this patent is extended or adjusted under 35 U.S.C. 154(b) by 127 days.

(21) Appl. No.: 13/574,965

(22) PCT Filed: Jan. 26, 2011

(86) PCT No.: PCT/EP2011/000347
§ 371 (c)(1),
(2), (4) Date: Oct. 8, 2012

(87) PCT Pub. No.: WO2011/092004
PCT Pub. Date: Aug. 4, 2011

(65) Prior Publication Data
US 2013/0122958 A1 May 16, 2013

(30) Foreign Application Priority Data
Jan. 26, 2010 (EP) .................................... 10368010

(51) Int. Cl.
*H04M 1/00* (2006.01)
*H04B 15/02* (2006.01)
*H04B 15/04* (2006.01)
(52) U.S. Cl.
CPC ............... *H04B 15/02* (2013.01); *H04B 15/04* (2013.01)

(58) Field of Classification Search
USPC ........ 455/110, 556.1, 73, 12.1, 75, 63.1, 260, 455/450; 713/300, 322, 501; 332/103; 329/345; 375/224, 346, 225, 355
See application file for complete search history.

(56) References Cited

U.S. PATENT DOCUMENTS

| 2004/0239415 | A1* | 12/2004 | Bishop .......................... 329/345 |
| 2005/0255881 | A1 | 11/2005 | Yamamoto et al. |
| 2007/0254599 | A1* | 11/2007 | O'Keeffe et al. ................ 455/75 |
| 2007/0259662 | A1* | 11/2007 | Lee et al. ....................... 455/433 |
| 2008/0129405 | A1* | 6/2008 | Belkerdid et al. ............. 332/103 |
| 2009/0138745 | A1* | 5/2009 | Dorsey et al. .................. 713/501 |
| 2009/0276639 | A1* | 11/2009 | Saha et al. ..................... 713/300 |

FOREIGN PATENT DOCUMENTS

WO 9637978 A1 11/1996

* cited by examiner

*Primary Examiner* — Kiet Doan
(74) *Attorney, Agent, or Firm* — Coats & Bennett, PLLC (57) ABSTRACT

A method for dynamically clocking one component located into a Wireless telecommunication apparatus comprising a RF transceiver subject to desensizitation by said component EMI, characterized in that it involves the steps of performing an adaptive control on the clock rate of said component so as to locate a wideband noise PSD null just to the left or to the right, in the frequency domain, of the RF transceiver wanted carrier frequency ($f_w$) Particularly, the control is performed by means of the control of programmable frequency dividers, and under the control of a general control unit (UCM) for the purpose of performing a contextual analysis of the current mode of operation of said wireless telecommunications and, in response to said contextual analysis, for determining the fine tuning of the clock rate to be applied to said component.

19 Claims, 6 Drawing Sheets

PROCESS AND APPARATUS FOR REDUCING EMI IN THE RF SUBSYSTEM OF A WIRELESS COMMUNICATION SYSTEM

TECHNICAL FIELD

The invention relates to the field of wireless communications and more particularly to a process and apparatus for reducing EMI in the RF subsystem of a wireless communication system.

BACKGROUND ART

Until recently, mobile wireless equipment used separate Integrated Circuits (ICs) for the Radio Frequency (RF) transceiver, the baseband (BB) processor and the Power Management Unit (PMU). In the context of the permanent perpetual quest for cost reduction, the approach taken by most IC vendors is that of a single chip, made up of either a single RF CMOS die, or multiple separate dies, which integrates into a single package all three previously listed ICs, namely, RF, BB and PMU into a single package.

Figure 1:
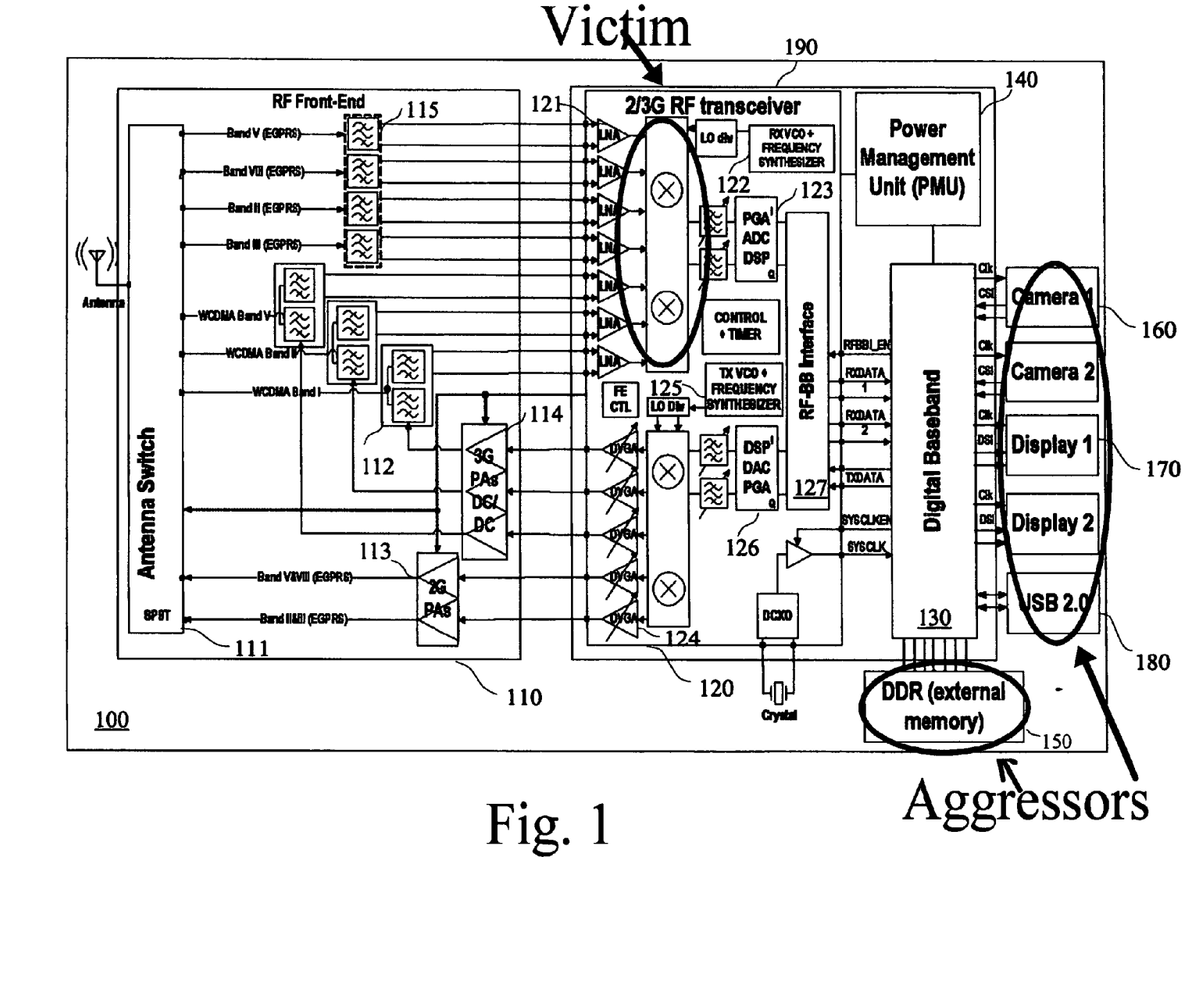
FIG. 1 shows an illustrative architecture of a mobile telephone including RF transceiver and different peripherals.

FIG. 1 shows a typical general architecture of a multiple-band 2G/3G phone 100 consisting of a quad band 2.75G (EGPRS), triple band 3G (HSPA+) with 3G receive diversity, comprising one single die 190, of a RF Front End circuit 110, a 2G/3G RF transceiver 120, a baseband 130, a PMU unit 140 and possibly DDR memory 150, being either external or internal, plus some additional components which are all listed below:

Label 110: mobile phone's RF front-end.
Label 111: Antenna switch used for switching between different frequency bands.
Label 112: 3G (HSPA) duplexer allows connection of the TX and RX path to the antenna switch and further achieves RF isolation between RF tx and RF rx chains.
Label 113: 2.75 G (EGPRS) power amplifiers
Label 114: 3G (HSPA) power amplifiers
Label 115: Diversity receiver RF bandpass filters
Label 190: Single die/single-chip RF (label 120)-BB(label 130)-PMU (label 140) IC.
Label 120: Multi-standard, multi-band RF transmit/ receive (transceiver) IC.
Label 130: Digital baseband (DBB) IC RF Front-End circuitry 110 supports quad band 2G (Band II, III, V, VIII EGPRS), triple band 3G (WCDMA I, II, III) which is typical of recent mobile phone architecture, the selection of the particular mode/band being performed by means of an antenna switch 111 which directs the signal to the appropriate set of front end filters 112. Conversely, antenna switch 111 directs the transmit signal generated by the appropriate 2G or 3G Power amplifiers, respectively 113 and 114, to the antenna.

2/3G transceiver 120 includes the conventional circuits required for achieving a 2G or 3G mobile communication, such as, in the receiving chain, Low Noise amplifiers (LNA) 121, a Rx VCO Frequency synthesizer 122 with appropriate division circuits (represented by local divider LO Div), a circuit 123 achieving programmable Gain amplifier (PGA), Analog to digital converter (ADC) as well as DSP processing. On the transmitting chain, transceiver 120 includes a circuit 126 achieving PGA, Digital to Analog (DAC) conversion as well as DSP processing, a Tx VCO frequency synthesizer 125 associated with dividing circuits (LO Div), and conventional digitally controlled Gain amplifier 124. Transceiver 120 further includes appropriate timing circuits 126 as well as a RF-BB baseband interface 127 for interfacing the baseband 130. For the sake of clarity, the different control, data and clock signals which are represented in FIG. 1 (such as RFB-Bi_EN, RX data 1, RX data 2, TX data 1, SYSCLKEN, SYSCLK) are conventional and known to the skilled man and do not need any further discussion.

Similarly, baseband 130 achieves communication between the transceiver 120 (through interface 127) with different devices and peripherals, such as two cameras 160, two displays 170, a USB device 180 through appropriate data and control leads (including CLK clocks and Chip Select CSi) as well as external DDR memory.

The integration of those components in a single die clearly reduces the cost of manufacturing a handset since the telecom pipe of the mobile phone now only requires very few extra additional components to make a phone call: one or several Power Amplifier(s) (PA) and its associated front-end circuitry such as RF bandpass filters, duplexers, antenna switch etc.

However, despite the significant cost saving resulting from the use of a single RF-BB-PMU chip, some significant EMI problems need to be considered in order to prevent the RF receiver as well as the RF transmitter chain from being polluted by digital BB and external memory bus noise, as well as associated clock spurs, and their multiple harmonics.

The present application particularly relates to the protection of the 2G receiver chain, identified in FIG. 1 as being the victim. In FIG. 1, the victim suffers from multiple sources of aggression which can be sorted into two categories:
Wideband noise source aggressors: falls into this category, noise generated by high speed data transfers between the single chip and its peripherals, such as camera, displays but also, USB and external memory interface (blocks 150, 160, 170, 180)
Narrowband spurs: falls into this category, either clock harmonics spurs, or pulsed clock source and their harmonics.

Some solutions are known in the art for reducing the effects of such additional spurs.

A first known solution consists in protecting the victim by carefully designing the LNA and systematically using differential wires in order to make best benefit of the common mode rejection of such a differential architectures.

A second known solution is based on the use of sophisticated packages (eg. so-called flip chip package) for embodying the RF transceiver integrated circuit may reduce the coupling between the input wire of the LNA and the digital interface, which coupling generally increases with the frequency.

All those techniques clearly tend to increase the design and manufacturing costs of the transceiver IC.

In some situations, those techniques do not allow to avoid desensitization of the receiver in some circumstances. In particular, it has been shown that multiple integer harmonics of the reference clock used to transfer data over the external memory interface desensitize an RF receiver.

SUMMARY OF THE INVENTION

It is an object of the present invention to provide a new method for facilitating the cellular integration, particularly the digital (MCU/DSP) and one or more RF subsystem.

It is another object of the present invention to provide a new wireless communication apparatus which allows simultaneous use of RF subsystem of a mobile phone, together with digital baseband operating in the same package while avoiding the desensitizing of the RF receiver located in the mobile phone.

It is an object of the present invention to provide a new clocking architecture suitable for a mobile telephone offering multiple multimedia functionalities.

It is a further object of the present invention to provide a new technique and method for defining the clock rate of individual component which are likely to generate wideband noise in one RF receiver, so as to minimize desensitization of the latter.

These and other objects of the invention are achieved by means of a method for dynamically clocking one component which is likely to desensitize a victim within the RF subsystem, such as the RF receiver for instance, comprising the step of performing an adaptive control on the clock rate of said component so as to locate a wideband noise PSD null just to the left or to the right, in the frequency domain, of the RF transceiver wanted carrier frequency ($f_w$).

In one embodiment, the control is based on the use of at least one programmable frequency divider Preferably, the control is performed by means of a general control unit (UCM) for the purpose of performing a contextual analysis of the current mode of operation of said wireless telecommunications and, in response to said contextual analysis, for determining the fine tuning of the clock rate to be applied to said component.

In one particular embodiment, the general control unit—the Use Case Manager—uses one of the following information for determining said frequency:
- the RF receiver wanted carrier frequency;
- the RF receiver operating frequency band,
- the RF receiver operating mode (EGPRS, WCDMA etc . . . )
- the RF receiver wanted carrier received power
- the component activity: a priori knowledge of min and max values of Pulse Repetition Frequencies and Fburst
- the component min/max clock frequency capabilities In one embodiment, the individual component which is likely to desensitize the victim is one of the following: a memory storage, a display, a USB interface or a camera interface.

The invention also achieves a wireless telecommunication apparatus comprising a RF transceiver for transmitting and receiving RF signals, a baseband comprising digital interface which are likely to desensitize said RF transceiver.

The apparatus is characterized in that it further comprises means for performing an adaptive control on the clock rate of said component so as to locate a wideband noise PSD null just to the left or to the right, in the frequency domain, of the RF transceiver wanted carrier frequency ($f_w$)

The fine tuning of the clock rate of the component is achieved by means of at least one programmable frequency divider In one embodiment, the apparatus includes a general control unit—a so called Use Case Manager—which performs a contextual analysis of the current is mode of operation of said wireless telecommunications and, in response to said contextual analysis, for determining the fine tuning of the clock rate to be applied to said component.

The invention is particularly suitable for achieving a 2G, 3G or LTE mobile phone incorporate highly sophisticated multimedia functionalities. Alternatively, it can be used for carrying out a Portable Document Assistant.

DESCRIPTION OF THE DRAWINGS

Other features of one or more embodiments of the invention will best be understood by reference to the following detailed description when read in conjunction with the accompanying drawings.

DESCRIPTION OF THE PREFERRED EMBODIMENT

It will now be described how one can improve the integration of digital baseband systems and circuits with one or more RF subsystem. Clearly, the method and system being described hereinafter are particularly suitable for the purpose of designing an new mobile phone fitted with multimedia and enhanced functionalities, such as Global Positioning System (GPS), Bluetooth, wireless lan, 2G and 3G, a high resolution camera and display(s) a TV out capability etc. . .

Clearly, the clocking architecture which will be described is suitable for allowing the combination of a wide number of features and functions such as mentioned above, but can also be used for a limited subset of functionalities.

Furthermore, it should be clear that the embodiments which will be described hereinafter should not be restricted to the telecommunication standards, nor to the frequency bands nor to the combination of bands which are shown in the illustrative example of FIG. 1. The technique described below can be used in a wide range of applications, and is particularly applicable to both 2G (EGPRS) systems and 3G systems (FDD-WCDMA all releases including Long Term Evolution), and can be advantageously incorporated in any recent architecture, such as typical architecture of FIG. 1.

Conventionally, each individual component, identified as an aggressor in a mobile phone, has its own clock signal which is generated by one Phase Locked loops so that, in the whole phone, no less than 10 PLLs can be simultaneously (and asynchronously) operated, each one corresponding to its particular functional entity.

The clocking of all those individual components—or aggressors—results, as mentioned in the first section of the present description, in wideband noise which might contribute to desensitize the RF receiver.

The present invention brings a partial solution to the problem of wideband noise falling in the first category, which is generated by high speed data transfers between the single chip and its peripherals, such as camera, displays but also, USB and external memory interface (blocks 150, 160, 170, 180).

For such wideband noise, the aggressor's frequency lobes result from the several high order harmonics of either the bit rate grid used to exchange data between the single chip I/O (input/output) pads and the external memory, or the external display(s), or the external camera(s), or even from the USB bus.

Figure 2:
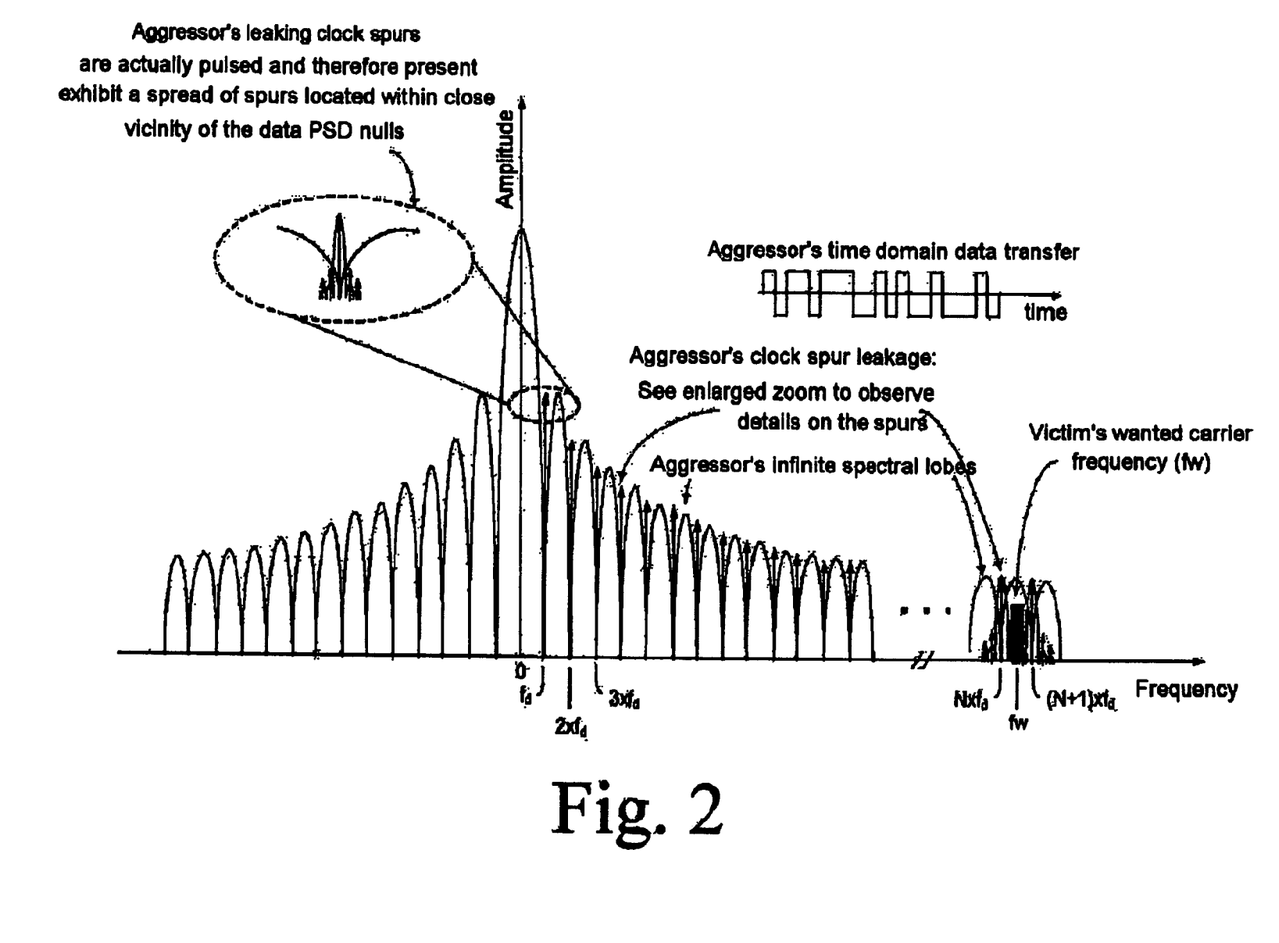
FIG. 2 shows the first power spectral density (PSD) properties of the first category of aggressor: wideband noise of a high speed data transfer on a serial or on a parallel interface

FIG. 2 shows the first power spectral density (PSD) properties of the first category of aggressor: wideband noise of a high speed data transfer on a serial or on a parallel interface, in the case of a high speed NRZ or RZ serial data link.

The victim's carrier frequency denoted $f_w$ is located in between the $N^{th}$ harmonic null (or zero) and the $N^{th}+1$ null of the aggressors PSD, thereby suffering from being jammed by the maximum PSD of the $N^{th}$ PSD lobe. It should be noticed that the data interface exhibits the spectrum of a pulsed clock spur leakage located at the frequency nulls of the data PSD.

As shown in the figure, the digital high speed serial interfaces generate wideband spectral lobes which span over several hundred of MHz, which can couple directly into the LNA input pin(s) via electromagnetic coupling of the long bonding wires which can be modeled as radiating transmissions lines, acting in a fashion very similar to antennae.

Figure 3A:
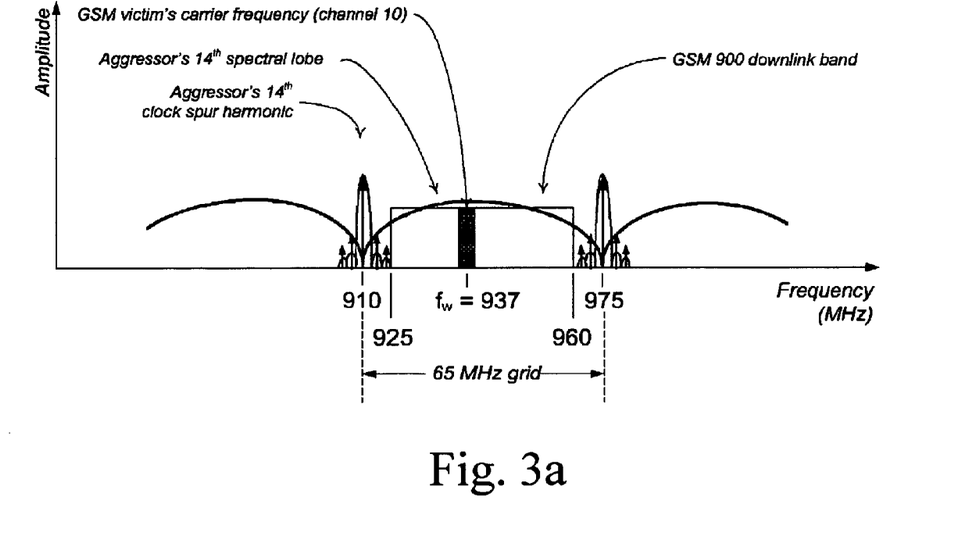
FIGS. 3a illustrates the situation of a single chip GSM 900 RF/BB/PMU receiver which shows to be desensitized by the presence of the external memory interface wideband noise being clocked at 65 MHz (crosses)

With respect to FIG. 3a, there is illustrated the severity of the problem for the case of a single chip GSM 900 RF/BB/PMU receiver which tends to be desensitized by the presence of the external memory interface wideband noise being clocked at 65 MHz (crosses). The victim's carrier frequency is set to 937 MHz (channel 10). It can be seen that the victim is located within a maximum of the aggressor's $14^{th}$ lobe PSD.

In order to reduce desensitization of the RF receiver by the different possible aggressors, it is proposed to implement a fine and adaptive control of the clocking of each individual component or functional block which is identified as a possible aggressor for the considered victim, generally the RF receiver. This fine adaptive control is performed by a general control unit—a so-called Use Case Manager (UCM)—which has the function of adjusting, at a very fine level, the clock rate of the considered component so as to precisely position the aggressor wideband noise PSD with respect to the considered victim's carrier.

In one embodiment, the control is performed so as to set the aggressor wideband noise PSD null just to the left or to the right, in the frequency domain, of the victim's wanted carrier frequency denoted "$f_w$".

It has been noticed that the fine adjustment of the null should not be exactly centered onto $f_w$, because of the presence of interface clock leakage, but very close near that value.

In any case, the skilled man will particularly define the best relative position of the victim's wanted carrier frequency "$f_w$" with respect to the aggressor wideband noise PSD null In one particular embodiment, the clocking rate of the individual aggressor(s) is/are defined by means of a central clocking system with a frequency plan being arranged so as to allow a dynamic, reprogrammable scheme under control by the USM, in order to move the grid based upon the a-priori knowledge of the downlink wanted carrier frequency. This permits the victim to always take advantage of the lowest possible aggressor noise PSD and yet avoids the eventual strong pulsed clock leakage located at the exact frequency nulls of the the aggressor PSD.

In one embodiment, the adjustment of the particular clock rate of the one individual component—or aggressor—is achieved by means of at least one programmable frequency divider providing high resolution dividing ratio, based on the combination of integer divide ratios and fractional divide ratios for achieving fine adjustment of the clocking frequency By precisely adjusting the frequency clocking of the considered aggressor—such as the DDR storage for instance—one can ensure that the impact of wide band noise generated by external high speed data interface of the previously identified aggressors is being minimized within the RF receiver.

In one particular embodiment, the Use Case Manager UCM is arranged to have high-level vision of the contextual operations of the mobile telephone, and particularly any frequency switching of the RF transmitter controlled by the base station, so as to precisely generate the appropriate control parameters for controlling the different clocks required by the different elements The latter more particularly uses the following information for controlling the fine tuning of the clock rate:
- victim's wanted carrier frequency (location of the victim in the frequency domain)
- victim's operating frequency band, and therefore a priori knowledge of duplex gap and duplex distance
- victim's operating mode (EGPRS, WCDMA etc . . . )
- victims's wanted carrier received power
- aggressor activity: a priori knowledge of min and max values of PRF1 and PRF2, and fburst
- aggressor min/max clock frequency capabilities (for eg. certain memories have tight tolerances on changing their operating clock frequencies)

Indeed, considering for instance the case of the carrier received power, it has been noticed when the received power is very low—which is the case when the mobile phone is far away from its base station—a fine control of the clock rate shows to be very critical so as to avoid any desensitization of the RF receiver and, therefore, the Use Case Manager (CM) is aware of such information so as to perform very fine and effective control of the clock rate of the memory storage.

To achieve the fine tuning of the clock rate of the aggressor, the USM continuously performs a contextual analysis of the mode of operation of the mobile phone, taking into account a number of input parameters above, so as to precisely determine the control parameters used by the programmable dividers and, thus, fix the clock rate of the considered aggressor.

For the sake of clarity, there will now be considered one illustrative example of a GSM900 channel 10 receiver victim and a new memory interface which is now clocked onto a 78 MHz grid instead of the previously shown 65 MHz grid.

Figure 3B:
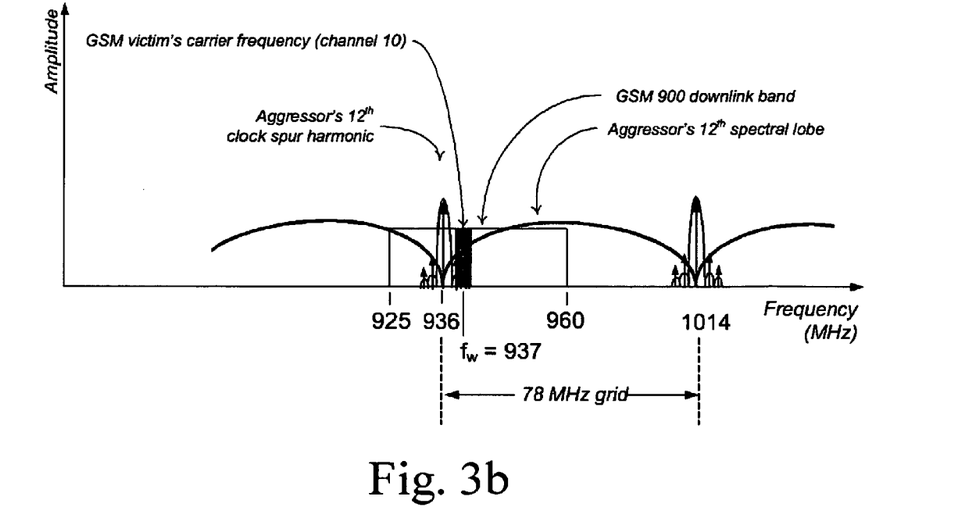
FIGS. 3b illustrates the situation of a single chip GSM 900 RF/BB/PMU receiver which shows to be desensitized by the presence of the external memory interface wideband noise being clocked at 78 MHz (crosses)

Such illustrative example is shown in FIG. 3b.

It can be seen that not only does the victim benefit from the lowest aggressor noise PSD, but it is also protected from the strong clock leakage. The skilled man will straightforwardly adapt the teaching of the invention to not only other victim's carrier frequencies within this frequency band, but also to other frequency bands of the ETSI GSM standard. Note also that the technique also applies to other telecommunication standards than EGPRS. For example, but not limited to, this invention can be applied to any of the frequency bands of a WCDMA 3GPP standard modulated carrier.

The fine control of the clock rate of the memory is achieved by means of a central system clock generator PLL associated with a set of integer frequency dividers to derive multiple grids from a unique master clock source on which the external peripherals can be clocked to ensure evasion of the aggressor noise PSD. To minimize cost and complexity, it is preferable, but not compulsory, that the unique system clock frequency is a multiple integer number of:
- The various crystal running frequencies, namely a multiple of 26 MHz and 19.2 MHz,
- Of the various interface data rates: for example 480 MHz for USB, 1248 MHz for M-PHY camera interfaces, etc.

Figure 4:
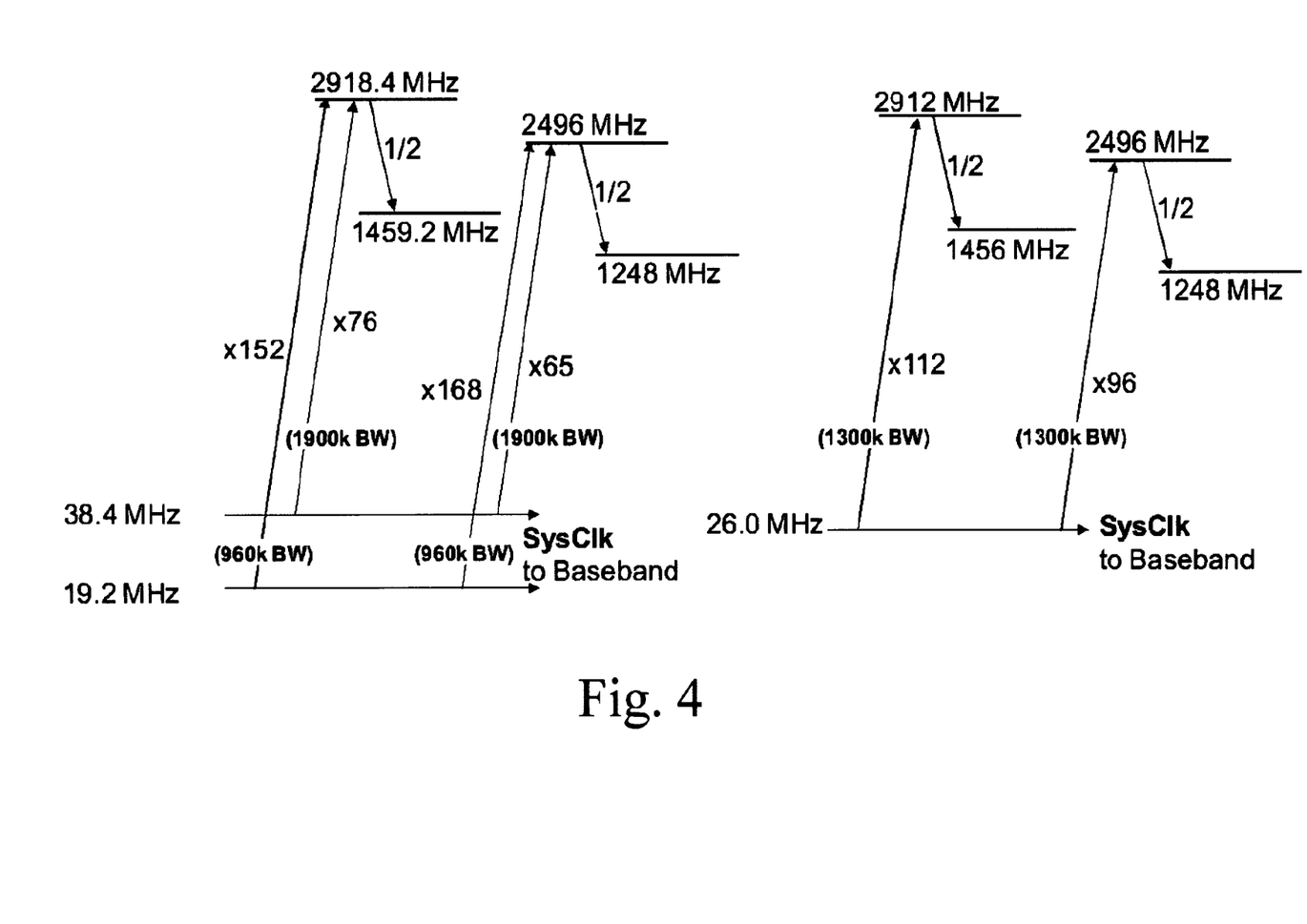
FIG. 4 illustrates one example of an arrangement of frequencies which are based on three independent references 19.2 Mhz, 26.0 Mhz and 38.4 Mhz.

Clock candidates that fullfil these requirements are 1248 MHz, 2496 MHz as shown in FIG. 4 illustrating a Master clock PLL source being the multiple integer of world's most used crystal frequencies: 26 and 19.2 MHz. It should be noticed that from 1248, the UMTS chip rate can be easily derived, as well as GSM, as well as LTE system clocks. USB 2.0 which uses 480 Mbit/s can also be derived since 1248 and 2496 are multiple integers of 24 MHz, and 480 MHz=24*20 MHz.

Figure 5:
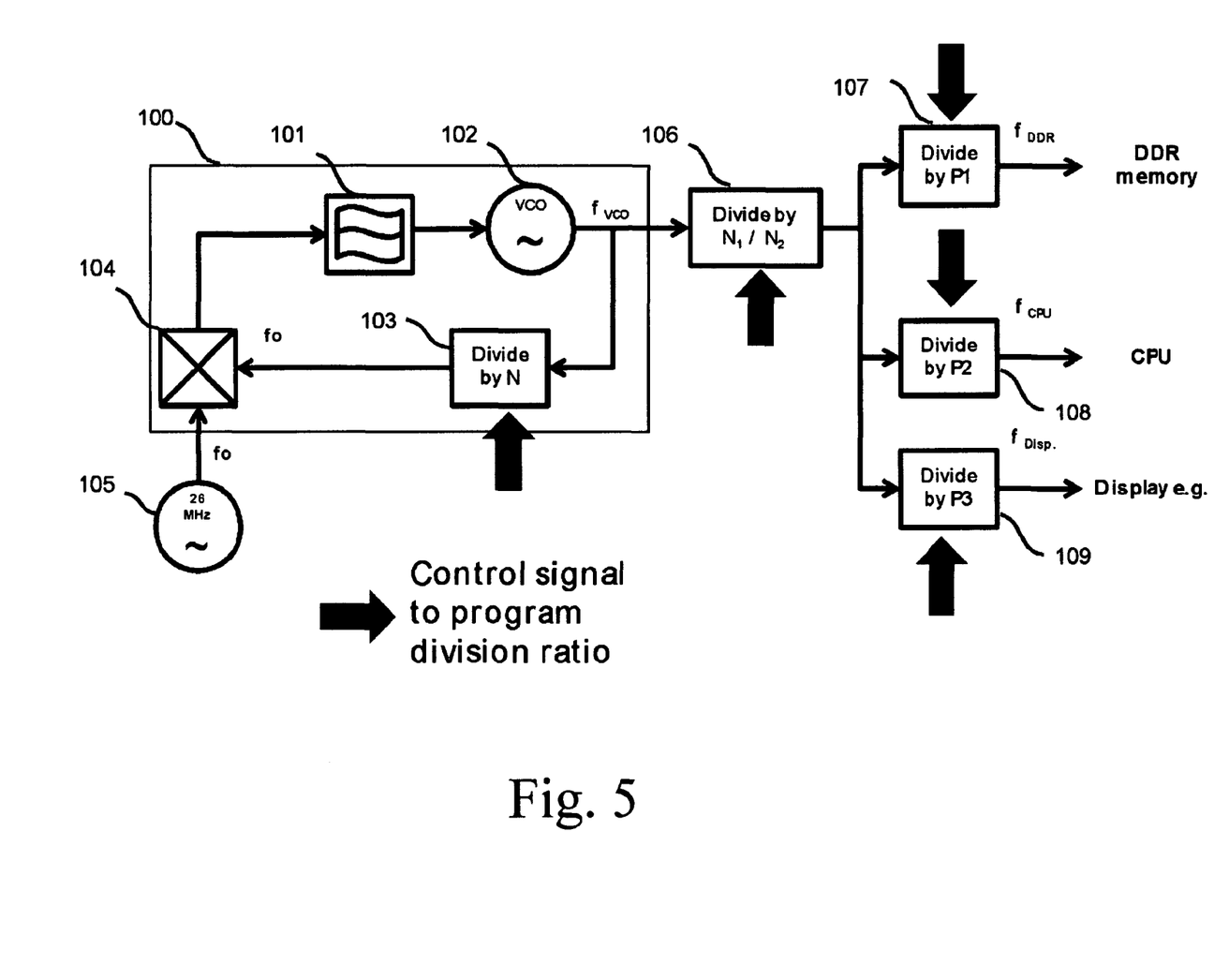
FIG. 5 illustrates one embodiment of a clocking architecture which allows dynamic control of the modulated Tx clock spurs in accordance with one embodiment.

FIG. 5 illustrates one possible—and non limiting—embodiment of a clock architecture which can be used for providing accurate control of the frequency values for different aggressors.

The architecture is based on at least one master clock reference, operating at $f_{VCO}$, for instance between 4 and 5 Ghz, and which can be used for generating all or most of the clocks used by the different constituents of the mobile phone, including the possible aggressors.

One sees a Phase Locked Loop (PLL) which is formed by means of oscillator 102 operating at $f_{VCO}$ the output of which being connected to the input of a programmable divide by N circuit 103 and which output is connected to a first input of a phase comparator circuit 104, a second input of which receives the output of a 26 MHz reference crystal oscillator 105. Note that this conventional PLL architecture may rely upon integer N or fractional N division ratios.

The PLL comprising blocks 101, 102, 103, and 104 is used for generating all frequency clock references, particularly required by the baseband (or also entitled "CPU"), the memory (or also known as "DDR") and display etc. For instance, the $f_{VCO}$ frequency is divided by a programmable divider 106 which allows any division between N to $N_1$ so as to provide a so called variable Digital clock which can be further divided by a dedicated programmable divider 108 used for clocking the Digital Signal Processor (DSP) or also called "Central Processing Unit" (CPU), as well as the divider 107 to feed the external DDR memory, the divider 109 to feed the camera interfaces etc.

Note that programmable division ratios N1, N2 of divider 106, P1 of divider 107, P2 of divider 108 and P3 of divider 109 can be either implemented in integer N or as fractional division ratios depending on the mobile phone application (number of bands, number of telecommunication standards being supported, etc).

It should be noticed that the architecture which is illustrated in FIG. 5 is only one illustrative example of how achieving one complete set of clocking signals which are derived from one single centralized master clock. In particular, the architecture can be adapted for the purpose of introducing some clock spreading techniques s which are out of the scope of the present invention, but which may be advantageously used by the skilled man.

It can be seen in FIG. 5 that all the different clocks are under control of the Use Case Manager. This is represented by the control leads of programmable dividers 103 and 106.

Accordingly, the Use Case Manager is thus able to precisely define and control the clocking of each "aggressor", in accordance with the particular context of use of the mobile phone, including the Tx modulated carrier frequency, the Tx modulated carrier power, the DL received carrier power, the operating frequency band (DD & DG), the mode of operation (2G, 3G), the clocking of the aggressor being considered.

Basically, the PLL IS arranged so as to provide all clocks—high speed and low speed—which are required for embodying a recent mobile phone including a wide range of multimedia functionalities.

Figure 6:
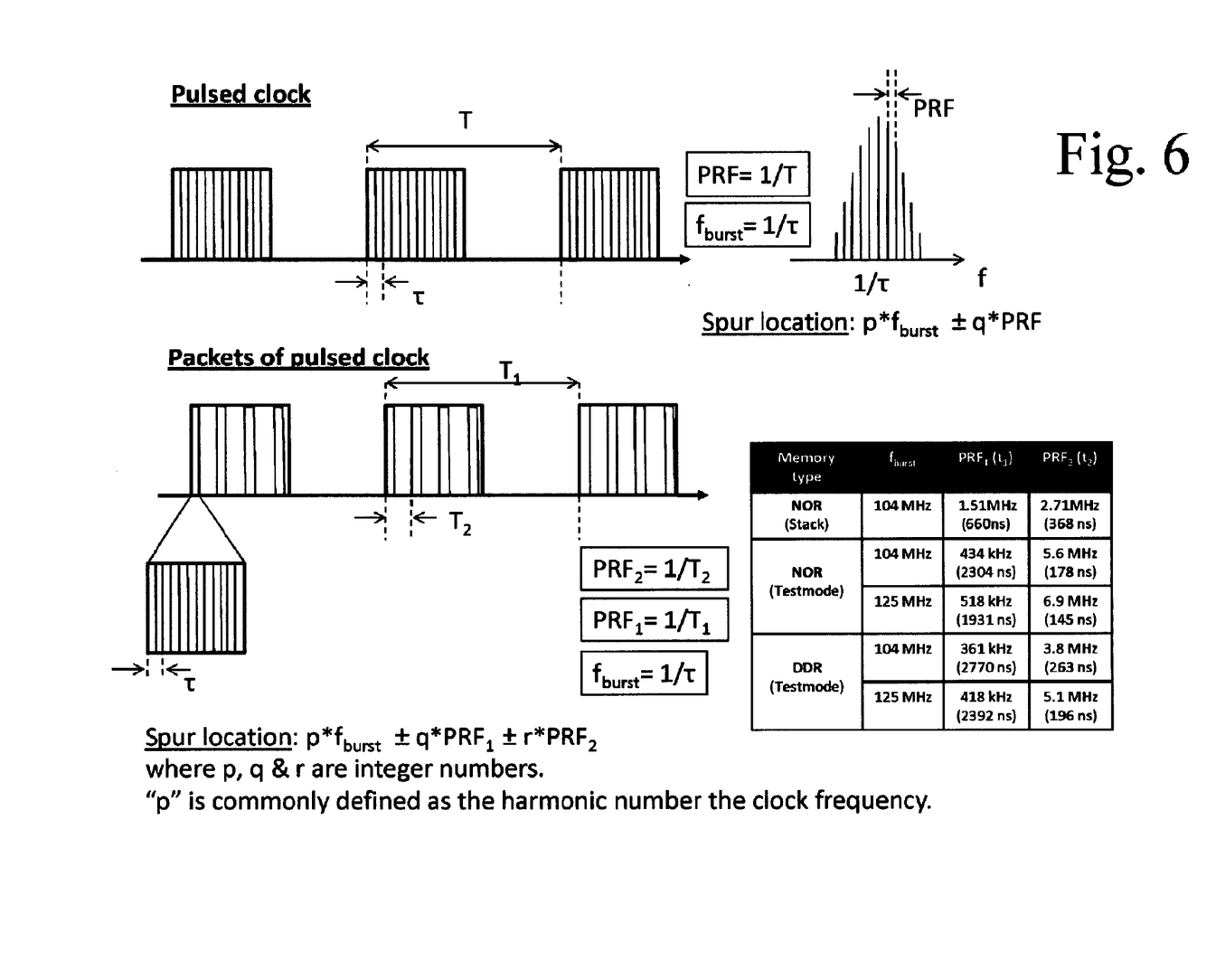
FIG. 6 illustrates in one example the determination of the spur location for different types of memory.

FIG. 6 illustrates, in the case of the memory, the determination of the position of the victim or RF carrier with respect to different possible situations:
 a. in the case of simple pulsed clock aggressors, the victim wanted carrier location in the frequency domain relative to the position of the data aggressor noise power spectral density null must be equal to the pulse repetition frequency (PRF=1/T). $f_{burst}$ is equal to 1/T The spur location is generally defined by : $p*f_{burst}+/-q*PRF$ with q being an integer number
 b. In the case of aggressors using packet of pulsed clock, the minimum frequency gap between the aggressor data PSD null and the location of the victim's carrier must be at least equal to $p*f_{burst}+PRF1+PRF2$.

The spur location is generally defined by : $p*f_{burst}+/-q*PRF1+/-r*PRF2$, where p, q & r are integer numbers, and "p" referring to the harmonic number of the clock frequency.

FIG. 6 also illustrates an example of numerical values for 2 different categories of memories or aggressors, with the indication of the particular values for parameter PRF1 and PRF2.

As a conclusion, the invention which was described above achieves a very effective mitigation technique which prevents wideband data spectral lobes from falling within the downlink carrier frequency to which the UE is attached to in either Cell DCH state for 3G, or in connected mode for 2G systems.

Advantages of the Invention

It has been shown that the invention achieves a very precise clock control so as to precisely set the wideband noise PSD null just to the left or to the right, in the frequency domain, of the RF transceiver wanted carrier frequency (fw). Indeed, instead of simply specifying that the wanted carrier frequency (fw) should be located between two consecutive harmonics, it has been discovered by the inventor that a very advantageous effect derives from the location of the wanted carrier frequency (fw) sufficiently close to the harmonics (but without being equal to it) so as to take advantage of a lower level of PSD.

What is claimed is:

1. A method for dynamically clocking one component located in a wireless telecommunication apparatus, the wireless communication apparatus including a Radio Frequency (RF) receiver subject to desensitization by Electro-Magnetic Interference (EMI) generated by said component, said EMI generating wideband noise having a set of Power Spectral Density (PSD) lobes separated by nulls and with clock harmonics located within the nulls, said method comprising:
 performing an adaptive control on a clock rate of said component so as to locate a wideband noise PSD) null to the left or to the right, in the frequency domain, of an RF receiver wanted carrier frequency.

2. The method according to claim 1, wherein said control is based on the use of at least one programmable frequency divider.

3. The method according to claim 1, wherein said control is performed by a general control unit performing a contextual analysis of the current mode of operation of said wireless telecommunications and, in response to said contextual analysis, for determining the fine tuning of the clock rate to be applied to said component.

4. The method according to claim 3, wherein said general control unit determines said frequency by use of an information selected from the group consisting of:
 the RF receiver wanted carrier frequency;
 the RF receiver operating frequency band;
 the RF receiver operating mode;
 the RF receiver wanted carrier received power;
 the component activity, including a priori knowledge of min and max values of Pulse Repetition Frequencies and fburst; and
 the component min/max clock frequency capabilities.

5. The method according to claim 1, wherein said component is one of a memory storage, a display, a Universal Serial Bus (USB) interface, and a camera interface.

6. The method according to claim 1, wherein a centralized master clock operates at a frequency between 4 and 5 Ghz.

7. The method according to claim 6, wherein said centralized master clock drives a set of Phase Locked Loops (PLLs) controlled by a central control unit.

8. The method of claim 1, wherein performing the adaptive control on the clock rate of the component includes:
    reducing an amount of wideband noise at the carrier frequency of the RF receiver; and
    protecting the carrier frequency of the RF receiver from the clock harmonics.

9. The method of claim 1, wherein the clock rate of the component and a phase locked loop (PLL) of the RF receiver are associated with a centralized master clock.

10. A wireless telecommunication apparatus including a Radio Frequency (RF) receiver subject to desensitization by Electro-Magnetic Interference (EMI) generated by a component, said EMI generating wideband noise having a set of Power Spectral Density (PSD) lobes separated by nulls and with clock harmonics located within the nulls, said apparatus comprising:
    a control unit for performing an adaptive control on a clock rate of said component so as to locate a wideband noise PSD) null to the left or to the right, in the frequency domain, of an RF receiver wanted carrier frequency.

11. The wireless telecommunication apparatus according to claim 10, wherein said control is performed by at least one programmable frequency divider.

12. The wireless telecommunication apparatus according to claim 10, wherein said control unit performs a contextual analysis of the current mode of operation of said wireless telecommunications and, in response to said contextual analysis, determines the fine tuning of the clock rate to be applied to said component.

13. The wireless telecommunication apparatus according to claim 12, wherein said control unit determines said frequency by use of information selected from the group consisting of:
    the RF receiver wanted carrier frequency;
    the RF receiver operating frequency band;
    the RF receiver operating mode;
    the RF receiver wanted carrier received power;
    the component activity, including a priori knowledge of min and max values of Pulse Repetition Frequencies and fburst; and
    the component min/max clock frequency capabilities.

14. The wireless telecommunication apparatus according to claim 10, wherein said individual component is one of a memory storage, a display, a Universal Serial Bus (USB) interface, and a camera interface.

15. The wireless telecommunication apparatus according to claim 10, further comprising a centralized master clock operates at a frequency between 4 and 5 Ghz.

16. The wireless telecommunication apparatus according to claim 10, wherein said wireless telecommunication apparatus is embodied in a 2G or 3G or Long Term Evolution (LTE) mobile phone.

17. The wireless telecommunication apparatus according to claim 10, wherein wireless telecommunication is embodied in a Portable Assistant Document.

18. The apparatus of claim 10, wherein the control unit is further configured to:
    reduce an amount of wideband noise at the carrier frequency of the RF receiver; and
    protect the carrier frequency of the RF receiver from the clock harmonics.

19. The apparatus of claim 10, wherein the clock rate of the component and a phase locked loop (PLL) of the RF receiver are associated with a centralized master clock.

\* \* \* \* \*